United States Patent [19]

Vaughan et al.

[11] Patent Number: 5,096,686
[45] Date of Patent: Mar. 17, 1992

[54] GALLIUM SILICATE ZEOLITE, ECR-9, AND ITS METALLO DERIVATIVES

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 594,578

[22] Filed: Oct. 9, 1990

[51] Int. Cl.$^5$ ............................................. C01B 33/34
[52] U.S. Cl. .................................... 423/328; 502/61; 502/77; 55/75; 585/820; 585/823; 585/824; 585/826
[58] Field of Search ............... 423/326, 328, 330, 331; 502/61, 64, 71; 55/75; 585/820, 823, 824, 826

[56] References Cited

U.S. PATENT DOCUMENTS

| | | | |
|---|---|---|---|
| 4,837,000 | 6/1989 | Takatsu et al. | 423/328 |
| 4,859,442 | 8/1989 | Zunes et al. | 423/328 |
| 4,892,721 | 1/1990 | Leonowicz et al. | 423/328 |
| 4,960,578 | 10/1990 | Vaughan et al. | 423/328 |

*Primary Examiner*—R. Bruce Breneman
*Attorney, Agent, or Firm*—Ronald D. Hantman

[57] ABSTRACT

The present invention relates to a metallo gallium silicate zeolite, designated as ECR-9. It also relates to a process for preparation of the zeolite. The zeolite may be employed in catalytic, absorbent or separation applications, particularly in the separation of small molecules, or normal from iso-paraffins, or the preferential reaction of n-paraffins in a mixed hydrocarbon stream.

12 Claims, No Drawings

GALLIUM SILICATE ZEOLITE, ECR-9, AND ITS METALLO DERIVATIVES

FIELD OF THE INVENTION

The present invention relates to a novel medium pore gallium silicate zeolite, designated as ECR-9, and its metal substituted derivatives. It also relates to a process for preparation of the zeolite. The zeolite may be employed in catalytic, adsorbent or separation applications, particularly in the separation of small molecules and the purification and separation of hydrocarbons.

BACKGROUND OF THE INVENTION

Zeolites, both mineral and synthetic, have been used in a variety of catalytic and adsorptive operations. Most zeolitic materials are porous ordered aluminosilicates having a definite (although often undetermined) crystal structure. The structure may have a number of small cavities interconnected by a number of larger channels. These cavities and channels are uniform in size within the particular zeolitic material. The above-mentioned catalytic and adsorptive processes make use of these cavities and channels since by proper choice of zeolite, the zeolite channels will reject some molecules, because of their size and/or affinity, and accept others.

These zeolites typically are describable as a rigid three-dimensional framework of silica and alumina (or other tetrahedral ions) wherein the silica and alumina (T atoms) tetrahedra are linked through common oxygens. The charge balance of the zeolite may be satisfied by inclusion of a proton, metal or ammonium cation. The catalytic and adsorption properties of the zeolite may be varied by changing the ions within the zeolite, or by changing the nature and ratios of the T atoms. Conventional ion exchange techniques may be used to change these cations. Details of nomenclature in these systems, as recommended by IUPAC, has been outlined by Barrer (Pure and Appl. Chem., 51, 1091 (1979)), and a recent review by J. V. Smith (Chem. Rev. 88. p. 149-182 (1988)).

There are a large number of both material and synthetic zeolitic structures. The wide breadth of such numbers may be understood by considering the work "Atlas of Zeolite Structure Types" by W. M. Meier and D. H. Olson (2nd edn., Butterworths/Intl. Zeolite Assoc. (1988)).

It is known to substitute such elements as gallium and germanium into some zeolite structures in the place of at least a part of the framework aluminum. More recently a wide variety of such element substitutions have been reported, particularly for the near silicas such as ZSM-5. However, in the high Al content zeolites, such substitution is usually very specific, allowing some T atom replacement only with specific elements within specific ranges. Such replacements seem to be controlled by the "flexibility" of the particular framework type, allowing only limited variation in T-O bond lengths and T-O-T angles. In some cases metallosilicates are possible which do not allow substitution of Al into T atom positions, or allow such substitution in a very limited manner—ECR-9 seems to be such a material.

The inventive zeolite ECR-9 is a gallium silicate zeolite, a sample of which was indexed on an orthorhombic lattice having the approximate parameters: a=14.2 Å, b=16.2 Å and c=8.6 Å in the Si-Ga form. The composition has the general composition, in terms of oxides, of:

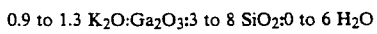

up to 40% of the gallium can be substituted by transition metals, such as Fe, Cr, Ni, Co, Zn, B, etc. Only low levels of Al substitution are tolerated (less than 10%). K may be partly substituted by Na and TEA (tetraethyl ammonium). Depending upon the nature and degree of such substitutions, unit cell values may vary around the value given above, and may even cause distortion of the orthorhombic symmetry observed for the Si-Ga form.

As mentioned above, other gallium-containing zeolites are known, and several of these have been described in the literature (Newsam and Vaughan, Proc. 7th Intl. Zeolite Conf., SSSC #34, Kodansha/Elsevier, p. 457 (1986)). However, gallium substitution may cause major disruption of structures, and induce such metastability that some known zeolites may not accept Ga substitution, resulting instead in either new zeolites or amorphous products.

For instance, U.S. Pat. No. 3,431,219, to Argauer, issued Mar. 4, 1969, discloses a crystalline gallium silicate of the compositions, in terms of oxide mole ratios:

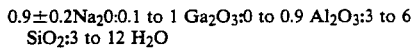

The zeolite has the crystalline structure of the large pore zeolite Type X, which is isostructural with naturally occurring faujasite. Other gallium faujasites of the X and Y types have been reported by Vaughan et al (Amer. Chem. Soc. Symp. Ser. 218, p. 231 (1983)).

Similarly, U.S. Pat. No. 4,083,807 to McKinney et al, issued Apr. 11, 1978, discloses zeolites which may contain some gallium in the framework position.

U.S. Pat. No. 4,331,774 to Boersma, issued May 25, 1982, details a gallium silicate which is stable to about 600° C.; has very strong peaks on the X-ray powder diffraction pattern at Bragg angles of 23.1 to 23.4 and 23.8 to 24.1 (2θ) strong peaks at 7.8 to 8.2 and 24.2 to 24.8 (2θ) and medium peaks at 8.7 to 9.1 and 29.7 to 30.1 (2θ); and, wherein the $Ga_2O_3/SiO_2$ molar ratio is less than 0.1.

None of the prior art teaching describes a zeolite having the structure and composition of ECR-9, having the X-ray diffraction pattern indigeneous to ECR-9, the essential lines of which are shown in Table 1, additionally recognizing that changes in cation content and T atom composition may influence the intensity of these diffraction peaks.

SUMMARY OF THE INVENTION

The present invention is a potassium gallium silicate zeolite designated for convenience herein as ECR-9, having major small molecule ($H_2O$, $H_2S$, $CO_2$) sorption capacity and slow paraffin sorption. The chemical composition for the base composition of this zeolite, expressed in terms of mole ratios of oxides, is in the range:

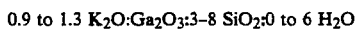

However, we have found that various substitutions can be made for Ga and K such that this base formulation can be expanded to:

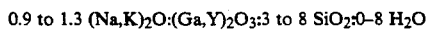

where the exchange cation is primarily K, but may be partly substituted by Na. Ga may be partly replaced by Al, Fe, Cr, Co, Ni, B and Zn in the T positions (Y), the degree of possible replacement (Y) varying with the particular element, but always being less than 40%. For instance, although Fe and Cr may substitute for Ga up to 40%, Al substitution over about 10% has not been observed.

The aluminosilicate herein may be used as a sorbent, e.g., in the separation of small molecules from larger molecules or in the separation of linear paraffins from linear olefins or single or multi-branched paraffins. When the product is used as a sorbent or catalyst, it may be exchanged with cations from Groups II through VIII of the Periodic Table or with hydrogen or ammonium ions. The $K^+$ form of ECR-9 will sorb 11.5% $CO_2$ and 10% weight of $H_2O$. The $NH_4^+$ form will sorb 17.5% by weight of $H_2$. Sorption properties indicate either an 8-ring or distorted 10-ring pore system, and cavities having appreciable free volume.

In another embodiment of this invention the zeolite may be prepared by a process comprising reacting a general composition:

0 to 10 $(TEA)_2O$:1.2 to 3 $(Na,K)_2O$:$(Ga,Y)_2O_3$:3 to 26 $SiO_2$:80 to 450 $H_2O$ (a) preparing a reaction mixture comprising an oxide of potassium, water, a source of gallia and silica, and if included said metal, Y; said reaction mixture having a composition, in terms of mole ratios of oxides, within the following ranges:

| | | |
|---|---|---|
| $(K,Na)_2O$:$(Ga + Y)_2O_3$ | 1.2 to | 3.0 |
| $SiO_2$:$(Ga + Y)_2O_3$ | 3 to | 26 |
| $H_2O$:$(Ga + Y)_2O_3$ | 80 to | 450 |
| $(TEA)_2O$:$(Ga + Y)_2O_3$ | 0 to | 10 |

(b) blending the reaction mixture sufficiently to form a substantially homogeneous mixture;
(c) maintaining the reaction mixture at a temperature between about 80° C. and 250° C. under autogenous pressure for a sufficient period of time to form the product crystals; and
(d) recovering the product ECR-9 crystals.

Although tetraethylammonium (TEA) has not been found to be included in the ECR-9 structure, and the template seems not to be structurally important, its exclusion from the syntheses containing sodium induces the formation of Linde L (U.S. Pat. No. 3,216,789) material as an impurity. It is therefore an inhibitor for impurities in the Na-K system, and a necessary component of the synthesis gel in such compositions where impurities may be dominant. It will be understood that the compositions herein may contain some waters of hydration (the x value above) which may be at least partially removed when the zeolites are employed as sorbents or catalysts.

DESCRIPTION OF THE PREFERRED EMBODIMENTS

The zeolite herein generally will have the formula, in terms of mole ratios of oxides in the K-Ga anhydrous form, in the range:

0.9 to 1.3 $K_2O$:$Ga_2O_3$:3 to 8 $SiO_2$

In various substituted forms the zeolite will have a generalized composition.

0.9 to 1.3 $M_2O$:(1-y) $Ga_2O_3$:y $Y_2O_3$:3-8 $SiO_2$ where M is K and Na and Y may be Al, Fe, Cr, Ni, Co, B, Zn, etc., and y is zero to 0.4.

Minor variations in the mole ratios of the oxides within the ranges given in the chemical formulas above do not substantially alter the structure or properties of the zeolite. In addition, the number of waters of hydration in the formula will not be the same for each preparation and will depend mainly on the degree to which the zeolite is dried, its cation content and cation exchange capacity.

The inventive zeolite ECR-9 may be indexed on an orthohombic lattice having the approximate parpameters: a=14.2 Å, b=16.2 Å, and c=8.6 Å. The essential X-ray diffraction peaks are given in Table 1.

TABLE 1

| d(A) | I/Io |
|---|---|
| 10.3–10.9 | 80–100 |
| 7.4–7.8 | 60–100 |
| 6.8–7.2 | 50–80 |
| 6.5–6.9 | 20–40 |
| 5.2–5.4 | 20–50 |
| 4.45–4.65 | 25–40 |
| 4.42–4.62 | 30–60 |
| 3.90–4.10 | 30–70 |
| 3.70–3.90 | 25–45 |
| 3.58–3.78 | 40–70 |
| 3.45–3.65 | 40–80 |
| 3.27–3.47 | 20–50 |
| 2.94–3.14 | 70–100 |
| 2.92–3.12 | 50–100 |
| 2.68–2.88 | 30–50 |

Intensity values, being a function of electron density in a particular crystallographic plane, may vary as a function of particular cation contents and the nature and degree of substitution of Y for Ga. Slight deviations of crystal symmetry may also be expected, particularly at high cation contents (low Si/(Ga+Y)) and high levels of Y.

TABLE 2

| D(Å) | I |
|---|---|
| 10.68 | W |
| 7.63 | M |
| 7.08 | W |
| 6.71 | VW |
| 4.54 | VW |
| 4.00 | M |
| 3.82 | M |
| 3.68 | M |
| 3.56 | W |
| 3.24 | VW |
| 3.04 | VS |
| 2.79 | W |
| 2.54 | W |

The patterns are produced by Cu-$K_2$ radiation and the peak strength is measured: W=weak, M=medium, S=strong, VS=very strong.

The detailed specific X-ray diffraction pattern for Example 1 is shown in Table 2.

The K+form of the zeolite will absorb 11.5% $CO_2$ by weight and 10.0% by weight of $H_2O$.

It may be desirable partially or full to replace the potassium and sodium ions in the zeolites. The exchangeable cations may be cations of metals from any one of Groups I through VIII of the Periodic Table of rare earth metals, depending on the end use desired. Preferably, the cations will be mono-, di- and trivalent metal cations, particularly from Groups I, II or III of the Periodic Table, such as barium, calcium, cesium, lithium, magnesium, sodium, strontium, zinc, or the like, or hydrogen, rare earth metals, or ammonium or alkylammonium ions. The presence of these exchangeable cations will generally not cause a substantial alteration of the basic crystal structure of the zeolite. Particularly preferred are mono- and divalent cations, as they are more easily included in the pores of the zeolite crystal. Any ion exchange technique may be employed such as those discussed, for example, in U.S. Pat. No. 3,216,789. Different exchangeable cations will change the absorbtive characteristics of the zeolite. For instance, substitution of $NH_4^+$ into the zeolite results in a product which adsorbs 17.5% by weight $H_2O$.

The zeolite herein may be prepared by a process in which a reaction mixture, generally a gel or slurry, is formed comprised of an oxide of potassium, water, and a source of silica, a source of gallia. The oxide of potassium may be, e.g., potassium hydroxide. The silica may be derived from sources such as, e.g., silicic acid, aqueous colloidal silica sols as described, for example, in U.S. Pat. No. 2,574,902, reactive amorphous fine particulate solid silicas such as fume silicas and chemically precipitated silica sols The gallium may be derived from sources such as, e.g., soluble gallium salts, potassium gallate, or the like. It is noted that the potassium oxide may be provided not only directly by adding, e.g., potassium hydroxide to the mixture, but also indirectly from the source of gallia. The preferred sources of gallia are gallium oxide dissolved in KOH and a gallium salt selected from the chloride, sulfate and nitrate salts.

The relative amounts of ingredients in the reaction mixture will be such that the mixture has a composition, in terms of mole ratios of oxides, within the following ranges:

| Oxide Constituents | Ranges of Mole Ratios |
|---|---|
| $K_2O:Ga_2O_3$ | 1.2 to 3 |
| $SiO_2:Ga_2O_3$ | 3 to 26 |
| $H_2O:Ga_2O_3$ | 60 to 450 |

Preferably, the mole ratio of $H_2O$ to $Ga_2O_3+Y_2O_3$) in the reaction mixture ranges from 80 to 400, and the mole ratio of $SiO_2$ to $Ga_2O_3$ or ($Ga_2O_3+Y_2O_3$) ranges from 5 to 20.

The order of mixing the ingredients is not essential, and all ingredients may be added simultaneously except that in those compositions including Y, the Y source is preferably added last as an acid salt, such as chloride, sulfate, nitrate, etc. In one preferred method of preparation a potassium silicate solution, is added to a blender, followed by slow addition, with mixing, of a potassium gallate solution. Additional water is added to the resulting slurry. The reaction mixture is ordinarily prepared in a container made of glass, teflon, or metal or the like which should be closed to prevent water loss.

The homogenized mixture is then placed in a reactor, ordinarily one which can withstand elevated pressures such as a tetrafluoroethylene-lined jar or an autoclave, where it is maintained at a temperature of between about 80° C. and 250° C., preferably 90° C. and 225° C., and, for commercial purposes, preferably no greater than 180° C. The exact crystallization will depend, for example, on the amount of potassium oxide present and the temperature employed for reaction. At temperatures above about 250° C., the zeolites obtained are no longer in substantially pure form. When the homogenized mixture is heated, it is maintained at autogenous pressures which will depend on the temperature employed. Lower pressures of 1 atm may be adequate for temperatures at the lower range but at higher temperatures up to 250° C. pressures of up to about 40 atm or higher may be achieved. The amount of time required for heating will depending mainly on the temperature employed, so that at 95° C. the heating may be carried out, e.g., for up to 18 days or more, whereas at, e.g., 220° C. or more the time period may be, e.g., 6 hours. In any event, the heating is carried out until crystals are formed of the zeolite product, i.e., ECR-9. The most economic process will depend upon the equipment available.

The crystallization time may be shortened, if desired, by seeding the slurry before or after the blending step with minor amounts of zeolite ECR-9 crystals of this invention which are preferably chopped at low temperatures into a size range less than about 0.05 μ before that seeding, or with a nucleant slurry as described elsewhere (e.g., in U.S. Pat. Nos. 3,574,538 or 4,340,573).

When the product crystals have been obtained in sufficient amount, they are recovered by centrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried in an air oven.

The zeolite ECR-9 of this invention may be used as a sorbent or as a catalyst. To be employed for these applications, the zeolite should be at least partially dehydrated by drying at temperatures of up to about 500° C. or more until most or all of the water of hydration is removed. Specific applications may require cation exchange into a particular chemical composition.

EXAMPLES

The examples which follow illustrate this invention. In all examples, parts and percentages are given by weight and temperatures in degrees Centigrade unless otherwise noted.

EXAMPLE 1

A gel composition,

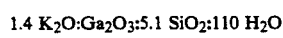

1.4 $K_2O:Ga_2O_3:5.1\ SiO_2:110\ H_2O$ was prepared by first making a potassium gallate solution by dissolving 14.3 gm $Ga_2O_3$ in 14.8 g KOH.0.5-$H_2O$ and 20 ml $H_2O$ using stirring and heat. To a 1.25 liter blender were added 58.3 g 40% colloidal silica (duPont Ludox, HS-40), the above potassium gallate solution and finally, with vigorous mixing, 0.78 g concentrated $H_2SO_4$ dissolved in 10 g water. Enough distilled water was added to bring the total weight of the mixture to 200 g. The mixture was then thoroughly homogenized and divided between two 75 ml stainless steel autoclaves. The autoclaves were placed in a 210° C. air oven for 9 hours, after which time they were cooled down to room temperature. The product was filtered, washed with distilled water, and dried in a 125°

C. oven. The X-ray powder diffraction pattern shows the white product to be crystalline ECR-9 and is similar to that in Table 2. Elemental analysis by ICP-AES gave 22.5% Ga; 20.4% Si; and 12.2% K which represents a stoichiometry of:

$$0.97\ K_2O:Ga_2O_3:4.50\ SiO_2$$

EXAMPLE 2

A gel composition, $$1.4\ K_2O:Ga_2O_3:5.1\ SiO_2:110\ H_2O$$

was prepared as in Example 1, but reacted at 160° C. for 42 hours. The product was filtered, washed with distilled water, and dried in a 125° C. oven. The X-ray powder diffraction pattern is given in Table 2 and FIG. 1 and shows the product to be crystalline ECR-9. This pattern can be indexed on an orthorhombic unit cell with dimensions of: a=14.00 Å, b=16.24 Å, c=8.63 Å. A two gram sample of this ECR-9 product was twice calcium exchanged with 4 g of $CaCl_2 \cdot 2H_2O$ in 20 ml $H_2O$ for one hour at 60° C. This calcium form of ECR-9 absorbed 6.5% n-hexane at 19° C. and 50 torr.

EXAMPLE 3

A gel of composition $$1.3\ TEA_2O:1.1\ K_2O:0.6\ Na_2O:(0.98\ Ga,0.02\ Al)_2O_3:9\ SiO_2:140\ H_2O:0.04\ Na_2SO_4$$

was prepared by first making a sodium, potassium gallate solution by dissolving 7.34 g $Ga_2O_3$ in 5.73 g $KOH \cdot 0.5H_2O$, 1.21 g NaOH and 10 ml $H_2O$ using stirring and heat. To a plastic beaker were added, with mixing, 52.5 g 40% colloidal silica (duPont Ludox, HS-40), 5.19 g of a "seed" solution (13.33 $Na_2O:Al_2O_3:12.5\ SiO_2:267\ H_2O$, see U.S. Pat. Nos. 3,574,538 and 4,340,573), 38.3 g of a 40% aqueous solution of tetraethylammonium hydroxide (RSA Corp., reagent grade), sodium, potassium gallate solution and 0.3 g of 50% $H_2SO_4$. Enough distilled water was added to bring the total weight of the mixture to 135 g. The mixture was then thoroughly homogenized in a blender and transferred to a 125 ml Teflon bottle. The gel was reacted at 100° C. for 7 days. The product was filtered, washed with distilled water, and dried in a 115° C. oven. The X-ray powder diffraction pattern is similar to that in Table 3 and shows the product to be crystalline ECR-9. Thermogravimetric analysis showed no presence of occluded template. Elemental analysis by ICP-AES gave 21.0% Ga; 21.0% Si; 1.03% Na; 0.29% Al; and 10.4% K which represents a stoichiometry of:

$$0.14\ Na_2O:0.85\ K_2O:(0.03\ Al,0.97\ Ga)_2O_3:4.80\ SiO_2$$

EXAMPLE 4

A gel of composition, $$3.5\ TEA_2O:0.67\ K_2O:0.8\ Na_2O:(0.98\ Ga,0.02\ Al)_2O_3:12\ SiO_2:180\ H_2O:0.27\ Na_2SO_4$$

was prepared by first making a sodium, potassium gallate solution by dissolving 12.5 g $Ga_2O_3$ in 5.95 g $KOH \cdot 0.5H_2O$, 4.43 g NaOH and 15 ml $H_2O$ using stirring and heat until a paste formed. The paste was cooled slightly and diluted with distilled $H_2O$ to a total weight of 41.5 g. To a plastic beaker were added, with mixing, 45.2 g 40% colloidal silica (duPont Ludox, HS-40), 3.33 g of a "seed" solution (13.33 $Na_2O:Al_2O_3:12.5\ SiO_2:267\ H_2O$, see U.S. Pat. Nos. 3,574,538 and 4,340,573), 66.0 g of a 40% aqueous solution of tetraethylammonium hydroxide (ALFA), 15.8 g of sodium, potassium gallate solution and 1.4 g of 48% $H_2SO_4$. Enough distilled water was added to bring the total weight of the mixture to 135 g. The mixture was then thoroughly homogenized in a blender and transferred to a 125 ml Teflon bottle. The gel was reacted at 100° C. for 3 days. The product was filtered, washed with distilled water, and dried in a 115° C. oven. The X-ray powder diffraction pattern is similar to that in Table 3 and shows the product to be crystalline ECR-9. Elemental analysis by ICP-AES gave 22.9% Ga; 19.6% Si; 3.08% Na; 0.32% Al; and 9.21% K which represent a stoichiometry of:

$$0.39\ Na_2O:0.69\ K_2O:(0.03\ Al,0.97\ Ga)_2O_3:4.1\ SiO_2$$

EXAMPLE 5

A gel of composition, $$7\ TEA_2O:0.67\ K_2O:0.8\ Na_2O:(0.98\ Ga,0.02Al)_2O_3:12\ SiO_2:262\ H_2O:0.27\ Na_2SO_4$$

was prepared by adding 31.8 g 40% colloidal silica (duPont Ludox, HS-40), 2.34 g of a "seed" solution (13.33 $Na_2O:Al_2O_3:12.5\ SiO_2:267\ H_2O$, see U.S. Pat. Nos. 3,574,538 and 4,340,573), 92.8 g of a 40% aqueous solution of tetraethylammonium hydroxide (ALFA), 11.1 g of sodium, potassium gallate solution (as made in Ex. 4), and 0.98 g of 48% $H_2SO_4$ to a plastic beaker while mixing with a spatula. Enough distilled water was added to bring the total weight of the mixture to 139 g. The mixture was then thoroughly homogenized in a blender and transferred to a 125 ml Teflon bottle. The gel was reacted at 100° C. for 8 days. The product was filtered, washed with distilled water, and dried in a 115° C. oven. The X-ray powder diffraction pattern is similar to that in Table 3 and shows the product to be crystalline ECR-9. Elemental analysis by ICP-AES gave 24.0% Ga; 18.0% Si; 3.26% Na; 0.38% Al; and 9.97% K which represents a stoichiometry of:

$$0.40\ Na_2O:0.71\ K_2O:(0.04\ Al,0.96\ Ga)_2O_3:3.58\ SiO_2$$

EXAMPLE 6

A gel of composition, $$10.1\ TEA_2O:0.67\ K_2O:0.8\ Na_2O:(0.98\ Ga,0.02\ Al)_2O_3:12\ SiO_2:350\ H_2O:0.27\ Na_2SO_4$$

was prepared by adding 23.5 g 40% colloidal silica (duPont Ludox, HS-40), 1.73 g of a "seed" solution (13.33 $Na_2O:Al_2O_3:12.5\ SiO_2:267\ H_2O$, see U.S. Pat. Nos. 3,574,538 and 4,340,573), 98.2 g of a 40% aqueous solution of tetraethylammonium hydroxide (ALFA), 8.2 g of sodium, potassium gallate solution (as made in Ex. 4), and 0.72 g of 48% $H_2SO_4$ to a plastic beaker while mixing with a spatula. Enough distilled water was added to bring the total weight of the mixture to 135 g. The mixture was then thoroughly momogenized in a blender and transferred to a 125 ml Teflon bottle. The gel was reacted at 100° C. for 8 days. The product was filtered, washed with distilled water, and dried in a 115°

C. oven. The X-ray powder diffraction pattern is similar to that in Table 3 and shows the product to be crystalline ECR-9. Thermogravimetric analysis showed no presence of occluded template. Elemental analysis by ICP-AES gave 23.7% Ga; 17.5% Si; 2.48% Na; 0.45% Al; and 10.3% K which represents a stoichiometry of:

0.30 Na$_2$O:0.74 K$_2$O:(0.05 Al, 0.95 Ga)$_2$O$_3$: 3.50 SiO$_2$

EXAMPLE 7

A gel composition, 0.8 TEA$_2$O:1.1 K$_2$O:1.1 Na$_2$O (0.98 Ga, 0.02 Al)$_2$O$_3$:9 SiO$_2$:140 H$_2$O was prepared by first making a sodium, potassium gallate solution by dissolving 6.81 g Ga$_2$O$_3$ in 5.32 g KOH.0.5H$_2$O, 2.52 g NaOH and 12 ml H$_2$O using stirring and heat until a paste formed. The paste was cooled slightly and diluted with distilled H$_2$O. To a plastic beaker were added, with mixing, 48.7 g 40% colloidal silica (duPont Ludox, HS-40), 4.81 g of a "seed" solution (13.33 Na$_2$O:Al$_2$O:Al$_2$O$_3$:12.5 SiO$_2$:267 H$_2$O, see U.S. Pat. Nos. 3,574,538 and 4 340 573) 21.8 g of a 40% aqueous solution of tetraethylammonium hydroxide (ALFA), and sodium, potassium gallate solution. Enough distilled water was added to bring the total weight of the mixture to 135 g. The mixture was then thoroughly homogenized in a blender and transferred to a 125 ml Teflon bottle. The gel was reacted at 100° C. for 9 days. The product was filtered, washed with distilled water, and dried in a 115° C. oven. The X-ray powder diffraction pattern is similar to that in Table 3 and shows the product to be crystalline ECR-9.

EXAMPLE 8

A gel of composition, 2.5 TEA$_2$O:1.67 K$_2$O:0.83 Na$_2$O:(0.98Ga,0.02Al)$_2$O$_3$:15 SiO$_2$:225 H$_2$O was prepared by first making a sodium, potassium gallate solution by dissolving 4.11 g Ga$_2$O$_3$ in 4.86 g KOH.0.5H$_2$O, 1.03 g NaOH and 8 ml H$_2$O using stirring and heat until a paste formed. The paste was cooled slightly and diluted with distilled H$_2$O. To a plastic beaker were added, with mixing, 49.5 g 40% colloidal silica (duPont Ludex, HS-40), 2.90 g of a "seed" solution (13.33 Na$_2$O:Al$_2$O$_3$:12.5 SiO$_2$:267 H$_2$O, see U.S. Pat. Nos. 3,574,538 and 4,340,573), 41.1 g of a 40% aqueous solution of tetraethylammonium hydroxide (ALFA), and sodium, potassium gallate solution. Enough distilled water was added to bring the total weight of the mixture to 135 g. The mixture was then thoroughly homogenized in a blender and transferred to a 125 ml Teflon bottle. The gel was reacted at 100° C. for 8 days. The product was filtered, washed with distilled water, and dried in a 115° C. oven. The X-ray powder diffraction pattern is given in Table 3 and FIG. 2 and shows the product to be crystalline ECR-9. This pattern can be indexed on an orthorhombic unit cell with dimensions of: a=14.12 Å; b=16.14 Å; c=8.64 Å. Elemental analysis by ICP-AES gave 20.2% Ga; 21.5% Si; 1.01% Na; 0.38% Al; and 11.7% K which represents a stoichiometry of:

0.14 Na$_2$O:0.98 K$_2$O:(0.05 Al, 0.95 Ga)$_2$O$_3$:5.04 SiO$_2$

EXAMPLE 9

A gel of composition,

3 TEA$_2$O:1.85 K$_2$O:1.85 Na$_2$O:(0.98 Ga,0.02 Al)$_2$O$_3$:20 SiO$_2$:300 H$_2$O was prepared by first making a sodium, potassium gallate solution by dissolving 3.48 g Ga$_2$O$_3$ in 4.58 g KOH.0.5H$_2$O, 2.45 g NaOH and 10 ml H$_2$O using stirring and heat until a paste formed. The paste was cooled slightly and diluted with distilled H$_2$O. To a plastic beaker were added, with mixing, 55.2 g 40% colloidal silica (duPont Ludox, HS-40), 2.42 g of a "seed" solution (13.33 Na$_2$O:Al$_2$O$_3$:12.5 SiO$_2$:267 H$_2$O, see U.S. Pat. Nos. 3,574,538 and 4,340,573), 52.1 g of a 40% aqueous solution of tetraethylammonium hydroxide (ALFA), and sodium, potassium gallate solution. Enough distilled water was added to bring the total weight of the mixture to 150 g. The mixture was then thoroughly homogenized in a blender and transferred to a 125 ml Teflon bottle. The gel was reacted at 100° C. for 11 days. The product was filtered, washed with distilled water, and dried in a 115° C. oven. The X-ray powder diffraction pattern is similar to that in Table 3 and shows the product to be crystalline ECR-9 with a minor ECR-34 impurity.

EXAMPLE 10

A gel of composition,

2 TEA$_2$O:K$_2$O:2 NaCl:(0.65 Ga, 0.02 Al, 0.33 Fe)$_2$O$_3$:9 SiO$_2$:143 H$_2$O was prepared by first making a sodium, potassium gallate solution by dissolving 15.0 g Ga$_2$O$_3$ in 16.1 g KOH.0.5H$_2$O, 7.41 g NaOH and 25 ml H$_2$O using stirring and heat until a paste formed. The paste was cooled slightly and diluted with distilled H$_2$O to a total weight 78.2 g. To a plastic beaker were added, with mixing, 44.3 g 40% colloidal silica (duPont Ludox, HS-40), 4.38 g of a "seed" solution (13.33 Na$_2$O:Al$_2$O$_3$: 12.5 SiO$_2$:267 H$_2$O, see U.S. Pat. Nos. 3,574,538 and 4,340,573), 49.6 g of a 40% aqueous solution of tetraethylammonium hydroxide (ALFA), 21.3 of sodium, potassium gallate solution, and 6.07 g FeCl$_3$.6H$_2$O dissolved in 10 ml H$_2$O. Enough distilled water was added to bring the total weight of the mixture to 137 g. The mixture was then thoroughly homogenized in a blender and transferred to a 125 ml Teflon bottle. The gel was reacted at 100° C. for 6 days. The brown product was filtered, washed with distilled water, and dried in a 115° C. oven. The X-ray powder diffraction pattern is similar to that in Table 3 and shows the product to be crystalline ECR-9. Elemental analysis by ICP-AES gave 16.1% Ga; 20.9% Si; 1.51% Na; 0.24% Al; 6.92% Fe; and 9.26% K which represents a stoichiometry of:

0.18 Na$_2$O:0.65 K$_2$O:(0.02Al,0.63 Ga, 0.34 Fe)$_2$O$_3$:4.1 SiO$_2$

EXAMPLE 11

A gel of composition,

2 TEA$_2$O:K$_2$O:2 NaCl:(0.65 Ga, 0.02Al,0.33 Cr)$_2$O$_3$:9 SiO$_2$:143 H$_2$O was prepared by first making a sodium, potassium gallate solution by dissolving 15.0 g Ga$_2$O$_3$ in 16.1 g KOH.0.5H$_2$O, 7.41 g NaOH and 25 ml H$_2$O using stirring and heat until a paste formed. The paste was cooled slightly and diluted with distilled H$_2$O to a total weight of 78.2 g. To a plastic beaker were added, with mixing, 44.4 g 40% colloidal silica (duPont Ludox, HS-40), 4.38 g of a "seed" solution (13.33 Na$_2$O:Al$_2$O$_3$:12.5 SiO$_2$:267 H$_2$O, see U.S. Pat. Nos. 3,574,538 and 4,340,573), 49.7 g of a 40% aqueous solution of tetraethylammonium hydroxide (ALFA), 21.3 g of sodium, potassium gallate solution, and 5.99 g CrCl$_3$.6H$_2$O dissolved in 10 ml H$_2$O. Enough distilled water was added to bring the total weight of the mixture to 142 g. The mixture was then thoroughly homogenized in a blender and transferred to a 125 ml Teflon bottle. The gel was reacted at 100° C. for 6 days. The green product was filtered, washed with distilled water, and dried in a 115° C. oven. The X-ray powder diffraction pattern is similar to that in Table 3 and shows the product to be crystalline ECR-9. Elemental analysis by ICP-AES gave 15.2% Ga; 19.9% Si; 2.01% Na; 0.33% Al; 5.98% Cr; and 8.31% K which represents a stoichiometry of:

0.25 Na$_2$O:0.62 K$_2$O:(0.04 Al,0.63 Ga,0.33 Cr)$_2$O$_3$:4.1 SiO$_2$

TABLE 3

X-Ray Diffraction Pattern From Example 2
CuKα Radiation

| 2-Theta | d(A) | I/Io |
|---|---|---|
| 8.34 | 10.59 | 96 |
| 10.87 | 8.13 | 7 |
| 11.62 | 7.61 | 100 |
| 12.60 | 7.02 | 61 |
| 13.20 | 6.70 | 37 |
| 15.00 | 5.90 | 1 |
| 16.26 | 5.45 | 15 |
| 16.71 | 5.30 | 27 |
| 17.55 | 5.05 | 11 |
| 19.39 | 4.574 | 32 |
| 19.65 | 4.514 | 39 |
| 20.57 | 4.314 | 16 |
| 22.27 | 3.988 | 49 |
| 23.33 | 3.810 | 38 |
| 24.21 | 3.673 | 57 |
| 25.05 | 3.552 | 67 |
| 25.38 | 3.506 | 13 |
| 26.40 | 3.374 | 42 |
| 27.38 | 3.255 | 13 |
| 27.72 | 3.215 | 18 |
| 28.12 | 3.171 | 16 |
| 29.36 | 3.039 | 87 |
| 29.58 | 3.017 | 68 |
| 30.19 | 2.958 | 15 |
| 30.88 | 2.893 | 23 |
| 31.56 | 2.832 | 19 |
| 32.14 | 2.783 | 41 |
| 32.92 | 2.718 | 9 |
| 33.40 | 2.680 | 14 |
| 33.54 | 2.670 | 13 |
| 34.10 | 2.627 | 10 |
| 34.52 | 2.596 | 23 |
| 34.72 | 2.582 | 17 |
| 35.30 | 2.540 | 27 |
| 35.46 | 2.529 | 35 |
| 36.91 | 2.433 | 17 |
| 39.33 | 2.289 | 6 |
| 39.70 | 2.268 | 8 |
| 40.37 | 2.232 | 7 |
| 41.44 | 2.177 | 8 |
| 42.29 | 2.135 | 9 |
| 43.87 | 2.062 | 7 |

TABLE 4

X-Ray Diffraction Pattern From Example 8
CuKα Radiation

| 2-Theta | d(A) | I/Io |
|---|---|---|
| 8.32 | 10.62 | 100 |
| 10.78 | 8.20 | 14 |
| 11.60 | 7.62 | 72 |
| 12.58 | 7.03 | 72 |
| 13.20 | 6.70 | 26 |
| 16.27 | 5.44 | 16 |
| 16.68 | 5.31 | 42 |
| 17.65 | 5.02 | 19 |
| 19.41 | 4.569 | 33 |
| 19.59 | 4.528 | 47 |
| 21.64 | 4.103 | 9 |
| 22.20 | 4.001 | 50 |
| 23.15 | 3.839 | 28 |
| 23.33 | 3.810 | 34 |
| 24.17 | 3.679 | 51 |
| 25.07 | 3.549 | 50 |
| 26.42 | 3.371 | 30 |
| 27.39 | 3.253 | 21 |
| 27.63 | 3.226 | 23 |
| 28.19 | 3.163 | 20 |
| 29.38 | 3.037 | 87 |
| 29.50 | 3.025 | 95 |
| 30.18 | 2.959 | 25 |
| 30.93 | 2.889 | 21 |
| 31.56 | 2.832 | 16 |
| 32.08 | 2.788 | 44 |
| 32.78 | 2.730 | 13 |
| 32.90 | 2.720 | 15 |
| 33.24 | 2.693 | 13 |
| 33.58 | 2.666 | 16 |
| 33.90 | 2.642 | 11 |
| 34.60 | 2.590 | 21 |
| 35.42 | 2.532 | 38 |
| 36.93 | 2.432 | 10 |
| 37.97 | 2.368 | 12 |
| 39.84 | 2.261 | 14 |
| 40.38 | 2.232 | 8 |
| 43.93 | 2.059 | 7 |
| 44.90 | 2.017 | 9 |

What is claimed is:

1. A zeolitic composition comprising, in terms of mole ratio of oxides:

0.9 to 1.3 M$_2$O:(Ga,Y)$_2$O$_3$; 3–8 SiO$_2$:0–8 H$_2$O and having the characteristic X-ray diffraction pattern,

| d(A) | I/Io |
|---|---|
| 10.3–10.9 | 80–100 |
| 7.4–7.8 | 60–100 |
| 6.8–7.2 | 50–80 |
| 6.5–6.9 | 20–40 |
| 5.2–5.4 | 20–50 |
| 4.45–4.65 | 25–40 |
| 4.42–4.62 | 30–60 |
| 3.90–4.10 | 30–70 |
| 3.70–3.90 | 25–45 |
| 3.58–3.78 | 40–70 |
| 3.45–3.65 | 40–80 |
| 3.27–3.47 | 20–50 |
| 2.94–3.14 | 70–100 |
| 2.92–3.12 | 50–100 |
| 2.68–2.88 | 30–50 | with M selected from the group consisting of Na, K, and combinations thereof; and with Y selected from the group consisting of the elements Fe, Al, B, Cr, Co, Ni, Zn, and combinations thereof.

2. The zeolite of claim 1 in which the ratio of K/Na is greater than unity, and the ratio of Ga/Y is greater than 1.5.

3. A process for preparing the zeolite of claim 1 which comprises:
(a) preparing a reaction mixture comprising an oxide of potassium, water, a source of silica and a source of gallia, said reaction mixture having a composition, in terms of mole ratios of oxides, within the following ranges:

| | |
|---|---|
| [(Na,K)$_2$O:Ga$_2$O$_3$] M$_2$O:(Ga,Y)$_2$O$_3$ | 1.2 to 3 |
| SiO$_2$:[Ga$_2$O$_3$] (Ga,Y)$_2$O$_3$ | 3 to 26 |
| H$_2$O:[Ga$_2$O$_3$] (Ga,Y)$_2$O$_3$ | 80 to 450 |
| (TEA)$_2$O:[6a$_2$O$_3$] Ga,Y)$_2$O$_3$ | 0 to 10 | where M is selected from the group consisting of Na, K, and combinations thereof; and Y is selected from the group consisting of the elements Fe, Al, B, Cr. Co, Ni, Zn, and combinations thereof;
(b) blending the reaction mixture sufficiently to form a substantially homogeneous mixture;
(c) maintaining the reaction mixture at between about 80° C. and 250° C. under autogenous pressure for a sufficient period of time to form crystals of the zeolite; and
(d) recovering said crystals.

4. The process of claim 3 wherein the zeolite has a composition, in terms of mole ratios of oxides in the range:

0.9 to 1.3 (Na,K)$_2$O:(Ga,Y)$_2$O$_3$:3 to 6 SiO$_2$ and K/Na is >1 and Ga/Y is >2.

5. The process of claim 4 wherein the reaction mixture is maintained between 90° C. and 220° C.

6. The process of claim 3 in which the source of silica is an aqueous silica.

7. The zeolite of claim 1 cation exchanged with hydrogen, ammonium or metal cations of groups 1 through 8 of the Periodic Table.

8. A sorbent composition of claim 7, bound with a mineral, or inorganic oxide, binder, useful for the separation of paraffins and olefins from multi-branded paraffins.

9. A sorbent composition of claim 7, bound with a mineral, or inorganic oxide, binder, useful for the separation of polar molecules having diameters less than about 6 Å.

10. The aluminogallo zeolite of claim 1 wherein Y is Al and Ga/Al ratio is greater than ten.

11. A zeolite composition comprising:

0.9 to 1.3 K$_2$O:Ga$_2$O$_3$:3 to 8 SiO$_2$ and having the characteristic X-ray diffraction pattern,

| d(A) | I/Io |
|---|---|
| 10.3–10.9 | 80–100 |
| 7.4–7.8 | 60–100 |
| 6.8–7.2 | 50–80 |
| 6.5–6.9 | 20–40 |
| 5.2–5.4 | 20–50 |
| 4.45–4.65 | 25–40 |
| 4.42–4.62 | 30–60 |
| 3.90–4.10 | 30–70 |
| 3.70–3.90 | 25–45 |
| 3.58–3.78 | 40–70 |
| 3.45–3.65 | 40–80 |
| 3.27–3.47 | 20–50 |
| 2.94–3.14 | 70–100 |
| 2.92–3.12 | 50–100 |
| 2.68–2.88 | 30–50. |

12. A process for preparing the zeolite of claim 11 which comprises:
(a) preparing a reaction mixture comprising an oxide of potassium, water, a source of silica and a source of gallia, said reaction mixture having a composition, in terms of mole ratios of oxides, within the following ranges:

| | |
|---|---|
| K$_2$O:Ga$_2$O$_3$ | 1.2 to 3 |
| SiO$_2$:Ga$_2$O$_3$ | 3 to 26 |
| H$_2$O:Ga$_2$O$_3$ | 80 to 450 |
| (TEA)$_2$O:Ga$_2$O$_3$ | 0 to 10 |

(b) blending the reaction mixture sufficiently to form a substantially homogeneous mixture;
(c) maintaining the reaction mixture at between about 80° C. and 250° C. under autogenous pressure for a sufficient period of time to form crystals of the zeolite; and
(d) recovering said crystals.

* * * * *